(12) United States Patent
Luo et al.

(10) Patent No.: US 10,610,043 B2
(45) Date of Patent: Apr. 7, 2020

(54) FOOD PREPARATION APPARATUS AND METHOD

(71) Applicant: KONINKLIJKE PHILIPS N.V., Eindhoven (NL)

(72) Inventors: Zhongchi Luo, Eindhoven (NL); Mo Li, Eindhoven (NL); Wei Li, Eindhoven (NL); Bin Yin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 225 days.

(21) Appl. No.: 15/571,519

(22) PCT Filed: May 4, 2016

(86) PCT No.: PCT/EP2016/060072
§ 371 (c)(1),
(2) Date: Nov. 3, 2017

(87) PCT Pub. No.: WO2016/177819
PCT Pub. Date: Nov. 10, 2016

(65) Prior Publication Data
US 2018/0140125 A1    May 24, 2018

(30) Foreign Application Priority Data

May 7, 2015  (WO) ................. PCT/CN2015/078491
Jul. 14, 2015  (EP) ...................................... 15176729

(51) Int. Cl.
*A47J 27/00*   (2006.01)
*A47J 43/07*   (2006.01)
(Continued)

(52) U.S. Cl.
CPC ............... *A47J 27/004* (2013.01); *A23L 5/00* (2016.08); *A23L 5/10* (2016.08); *A23L 27/00* (2016.08);
(Continued)

(58) Field of Classification Search
CPC ...... A47J 27/004; A47J 36/321; A47J 36/165; A47J 36/32; A47J 43/044; A47J 43/07;
(Continued)

(56) References Cited

U.S. PATENT DOCUMENTS

| 3,966,973 A | * | 6/1976 | Henry | .................. | G01N 27/048 426/231 |
| 5,512,733 A | | 4/1996 | Takikawa | | |

(Continued)

FOREIGN PATENT DOCUMENTS

| JP | 04073283 B2 | 4/2008 |
| WO | 2005092158 A2 | 10/2005 |

OTHER PUBLICATIONS

J. Ahmed et al., "Dielectric properties of butter in the MW Frequency range as affected by salt and temperature", Journal of Food Engineering, vol. 82, 30, Oct. 2007, pp. 351-358.
(Continued)

*Primary Examiner* — Steven N Leff

(57) ABSTRACT

Disclosed is a food preparation apparatus (100) comprising a food preparation compartment (101); a dielectric sensor (120) in said food preparation compartment, a data storage device (130) storing food seasoning data as a function of a dielectric constant of the food product, said food seasoning data relating to a plurality of condiments to be added to the food product; and a processor arrangement (110) coupled to said dielectric sensor. The processor arrangement is adapted to determine a dielectric property of a food product in the food preparation compartment from sensor data provided by said dielectric sensor; retrieve food seasoning data for the food product corresponding to the determined dielectric property from the data storage device; and, for each condiment of said plurality generate a seasoning instruction signal for adding an amount of said condiment of said plurality to the food product based on the retrieved food seasoning data (Continued)

until all condiments of said plurality have been added to the food product. A method of automatically generating seasoning instructions for adding a plurality of condiments to a food product during preparation of the food product is also disclosed.

12 Claims, 8 Drawing Sheets

(51) Int. Cl.
    *A23L 5/00*     (2016.01)
    *A23L 5/10*     (2016.01)
    *A23L 27/00*     (2016.01)
    *A47J 36/32*     (2006.01)
    *A47J 43/044*     (2006.01)
    *A47J 36/16*     (2006.01)

(52) U.S. Cl.
    CPC ............. *A47J 36/165* (2013.01); *A47J 36/32* (2013.01); *A47J 36/321* (2018.08); *A47J 43/044* (2013.01); *A47J 43/07* (2013.01); *A23V 2002/00* (2013.01)

(58) Field of Classification Search
CPC ... A23L 27/00; A23L 5/00; A23L 5/10; A23V 2002/00
See application file for complete search history.

(56) References Cited

U.S. PATENT DOCUMENTS

| | | | |
|---|---|---|---|
| 6,496,018 | B1 | 12/2002 | Nagata |
| 7,174,830 | B1 | 2/2007 | Dong |
| 2006/0110504 | A1 | 5/2006 | Pelletier |
| 2012/0164022 | A1 | 6/2012 | Muginstein |
| 2016/0025787 | A1 | 1/2016 | Muller |

OTHER PUBLICATIONS

N. Gavish, Keith Promislow, "Dependence of the dielectric constant of electrolyte solutions on ionic concentration", pp. 1-5, Aug. 25, 2012.

* cited by examiner

FOOD PREPARATION APPARATUS AND METHOD

This application is the U.S. National Phase application under 35 U.S.C. § 371 of International Application No. PCT/EP2016/060072, filed on May 4, 2016, which claims the benefit of International Application No. PCT/CN2015/078491 filed on May 7, 2015 and International Application No. 15176729.0 filed Jul. 14, 2015. These applications are hereby incorporated by reference herein.

FIELD OF THE INVENTION

The present invention relates to a food preparation apparatus and a method for controlling a cooking process using such a food preparation apparatus.

BACKGROUND OF THE INVENTION

One of the key aspects of good food preparation is seasoning of the food product. The taste of food products is largely determined by the applied seasoning such that it is critically important to apply the correct amount of seasoning to a dish. This is however not a trivial exercise, as inexperienced cooks may misjudge the amount of seasoning to be added to the food product in order to bring it to an appealing taste, which may lead to the food product being bland or unpleasant to eat. Several cooks furthermore dislike tasting the food product during cooking, or do not have well-developed taste, such that they do not know what the food product tastes like after seasoning until they consume the food product. Even though such cooks may be experienced in adding seasoning, this can still lead to the cooking of food products that do not have the desired taste due to misjudgements in the applied seasoning.

Moreover, certain types of seasoning can be detrimental to the health of a consumer of a food product including the seasoning if too much of the seasoning has been added. A prime example of such a potentially hazardous condiment is salt (NaCl), which can increase blood pressure when consumed in large amounts and can for instance increase the risk of heart disease or stroke.

It is known from J. Ahmed et al. in Journal of Food Engineering, Volume 82 (3), October 2007, pages 351-358 that unsalted and salted butter exhibit significantly different dielectric properties at different temperatures.

SUMMARY OF THE INVENTION

The present invention seeks to provide a food preparation apparatus that provides better control over food seasoning.

The present invention further seeks to provide a method that facilitates better control over the seasoning of a food product during its preparation such as cooking.

According to an aspect, there is provided a food preparation apparatus comprising a food preparation compartment; a dielectric sensor in said food preparation compartment, a data storage device storing food seasoning data as a function of a dielectric constant of the food product, said food seasoning data relating to a plurality of condiments to be added to the food product; and a processor arrangement coupled to said dielectric sensor and adapted to determine a dielectric property of a food product in the food preparation compartment from sensor data provided by said dielectric sensor; retrieve food seasoning data for the food product corresponding to the determined dielectric property from the data storage device; and for each condiment of said plurality generate a seasoning instruction signal for adding an amount of said condiment of said plurality to the food product based on the retrieved food seasoning data until all condiments of said plurality have been added to the food product.

The present invention is based on the realization that many condiments, e.g. salt, vinegar, pepper, sodium glutamate, and so on, contain electrolytes that will affect the dielectric properties of the food product. For example, a food product may exhibit reduced reflection of a signal such as a RF signal transmitted into the food product when the concentration of electrolytes in the food product increases. Therefore, the dielectric property may be used to produce seasoning instruction signals for the food product in accordance with the stored food seasoning data and the determined dielectric property, such that the respective amounts of condiments to be added to the food product may be accurately determined in order to produce a food product having the desired taste.

Preferably, the processor arrangement is adapted to monitor a change in the dielectric property of the food product from said sensor data, wherein said change is indicative of the addition of one of said condiments; and, upon the monitored change indicating that the amount of the previous condiment has been added to the food product generate an updated seasoning instruction signal for adding an amount of a next condiment of said plurality to the food product based on the retrieved food seasoning data. This ensures that the added amount of each condiment is accurately determined before a next condiment adding instruction is generated, thereby providing a food preparation apparatus that allows for particularly accurate addition of condiments to the food product.

The processor arrangement may be adapted to dynamically adjust the seasoning instruction signal for adding a condiment to the food product in response to said monitored change and/or to generate a warning signal if the monitored change is indicative of an excess of said condiment having been added to the food product. This provides useful user feedback and reduces the risk of inaccurate condiment addition and/or the risk of a food product being served that is incorrectly seasoned.

In a particularly advantageous embodiment, the processor arrangement is adapted to generate the respective seasoning instruction signals for said condiments such that the condiments are added to the food product in a sequence of increasing electrolyte strength. This ensures that condiments causing only a small change in the dielectric property of the food product are added first, which increases the accuracy of the dielectric property monitoring due to the fact that inaccuracies in the addition of the amount of this 'weak electrolyte' condiment are not masked by a high baseline value of the dielectric property resulting from the previous addition of stronger electrolyte condiments.

The food preparation apparatus may further comprise a temperature sensor and a heating element, wherein the processor arrangement is arranged to control the heating element in response to a sensor signal provided by the temperature sensor. In this embodiment, the food preparation apparatus may be a food cooking apparatus.

Advantageously, the processor arrangement is adapted to control the heating element such that a temperature of the food product is maintained below a boiling temperature of the food product during determination of said dielectric properties and subsequent generation of said seasoning instruction signals. This avoids turbulence and/or rapid reduction of the moisture content in the food product through evaporation, which can compromise the accuracy of the dielectric property determination.

The processor arrangement preferably is adapted to maintain the temperature of the food product to below 50° C., preferably at around 43° C. or less in order to obtain a stable reading of the dielectric property, with the constitution, i.e. moisture content of the food product being relatively constant during the addition of the various condiments to the food product.

In an embodiment, the food preparation apparatus comprises a display, wherein the seasoning instruction signals are adapted to display seasoning instructions on said display. This allows for the accurate manual addition of the various condiments to the food product.

In this embodiment, the food preparation apparatus may further comprise a lid on said food preparation compartment, said lid including an inlet for said condiments. Such a lid allows for the addition of the condiments to the food product through the inlet, such that the lid does not have to be removed from the compartment. This limits the loss of moisture from the food product and therefore improves the accuracy of the condiment adding process due to the fact that changes in the measured dielectric property can be predominantly or even solely attributed to the added condiments.

Alternatively, the food preparation apparatus comprises a plurality of seasoning dispensing units each having a controllable outlet for dispensing one of said condiments into the food preparation compartment, wherein each seasoning instruction signal is adapted to control the outlet of the seasoning dispensing unit comprising the condiment to be added to the food product. This allows for fully automated addition of seasoning to the food product, thus ruling out user error.

The dielectric sensor preferably comprises a RF (radiofrequency) transmitter for transmitting RF signals into the food product and a receiver for receiving reflected RF signals from said food product, wherein the processor arrangement is adapted to derive the dielectric property from the reflected RF signals. The reflected RF signals are particularly suitable for deriving a meaningful dielectric property of the food product from these signals.

The food preparation apparatus may further comprise a stirring element for stirring the food product in the food preparation compartment to speed up the even distribution of the condiments to the food product. This can speed up the overall seasoning process, which reduces the risk of inaccurate dielectric property determination during this process, e.g. through loss of moisture.

According to another aspect, there is provided a method of automatically generating seasoning instructions for adding a plurality of condiments to a food product during preparation of the food product, the method comprising providing an electronic cookbook of the food product, said electronic cookbook comprising food seasoning data for each condiment as a function of a dielectric property of the food product; and repeatedly determining the dielectric property of the food product; and generating a seasoning instruction signal for adding an amount of said condiment of said plurality to the food product based on the determined dielectric property and the food seasoning data in the electronic cookbook until all condiments of said plurality have been added to the food product.

This method ensures that an accurate seasoned food product can be produced without its cook needing to have experience in accurately seasoning the food product.

The method may further comprise monitoring a change in the dielectric property of the food product, wherein said change is indicative of the addition of one of said condiments; and, upon the monitored change indicating that the amount of the previous condiment has been added to the food product generating an updated seasoning instruction signal for adding an amount of a next condiment of said plurality to the food product based on the retrieved food seasoning data. This further improves the accuracy of the seasoning of the food product as explained in more detail above.

Determining the dielectric property of the food product and generating a seasoning instruction signal for adding an amount of said condiment of said plurality to the food product based on the determined dielectric property and the food seasoning data in the electronic cookbook until all condiments of said plurality have been added to the food product may be performed at a constant temperature below the boiling point of the food product, preferably a constant temperature below 50° C., more preferably a constant temperature of about 43° C. or less to further improve the accuracy of the seasoning of the food product as explained in more detail above.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
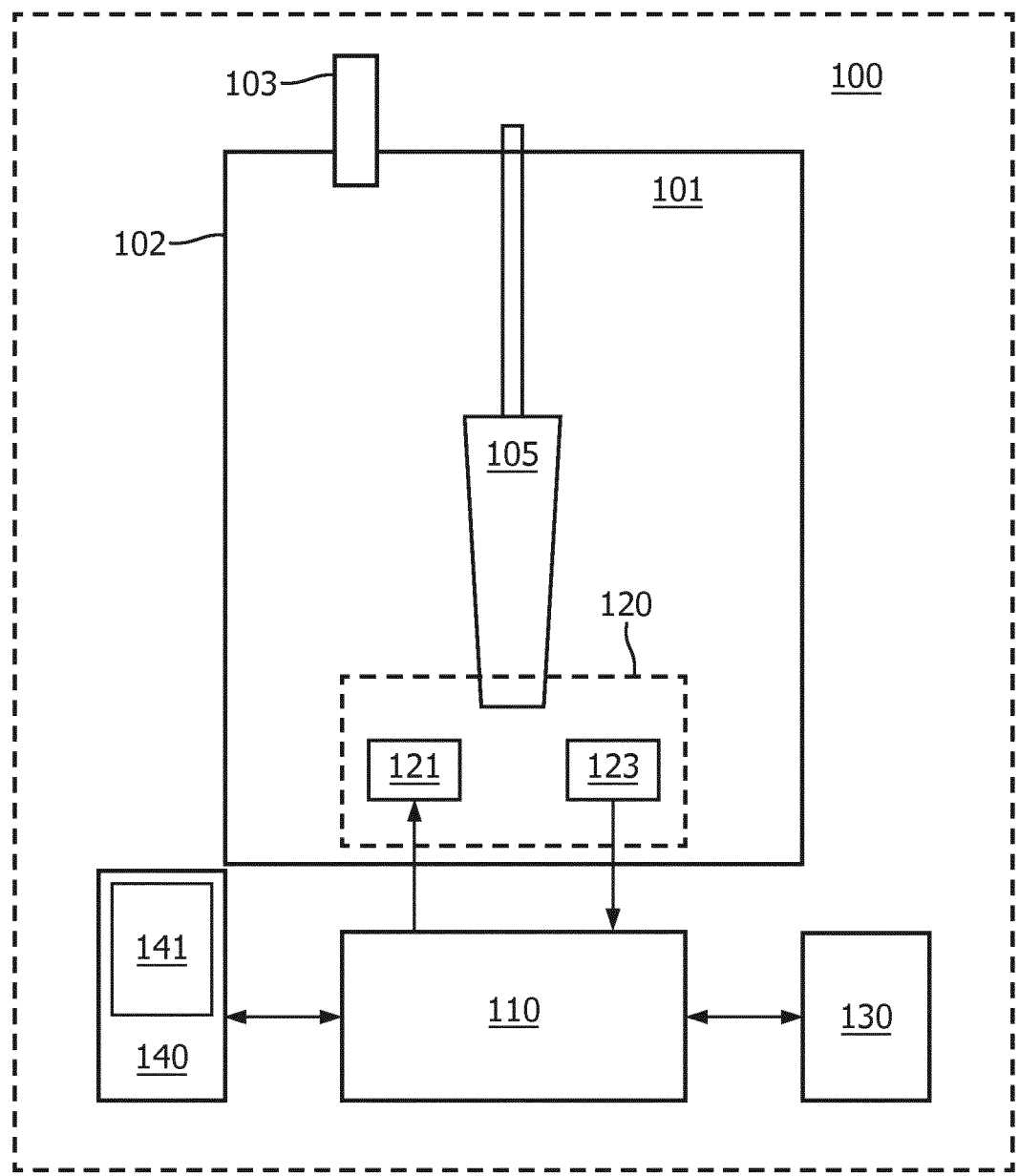
FIG. 1 schematically depicts a food preparation apparatus according to an embodiment.

It should be understood that the Figures are merely schematic and are not drawn to scale. It should also be understood that the same reference numerals are used throughout the Figures to indicate the same or similar parts.

FIG. 1 schematically depicts a food preparation apparatus 100 according to an embodiment. The apparatus 100 comprises a food preparation compartment 101 in which a dielectric sensor 120 is located for sensing a dielectric property of a food product being prepared in the apparatus 100. As will be explained in more detail below, the sensed dielectric property may be used to determine an amount of seasoning added to the food product. This is because most types of seasoning, e.g. salt (NaCl), vinegar, sodium glutamate and so on, generate electrolytes, e.g. ions, when being dissolved in the food product, which electrolytes alter the dielectric properties of the food product. Therefore, the sensing data produced by the dielectric sensor 120 can be utilized to control the seasoning of the food product with condiments that generate electrolytes when dissolved in the food product.

In an embodiment, the dielectric sensor 120 comprises a transmitter 121 and a receiver 123 for receiving a reflection of a signal transmitted by the transmitter 120. The dielectric sensor 120 preferably is arranged to transmit a RF signal into food product in the compartment 101. The RF signal may be a signal of single frequency or signal encompassing a spectrum of frequencies. Any suitable frequency or frequency range may be contemplated. It has been found that the ratio (S11) of reflected RF power to transmitted RF power by such an RF dielectric sensor 120 can be related to the electrolyte content in a food product containing water. This can be understood as follows. RF radiation is often used to monitor dielectric properties. When applying an alternating external electromagnetic field at radio frequencies, e.g. to a food product, the movement of free ions and polar molecules therein aligns in the direction of the electric field. This behavior consumes energy from the electromagnetic field, such that information about the dielectric properties of the substance under investigation can be obtained by measuring the reflected signal strength.

It is noted that the low frequency part of the RF domain is more sensitive to the energy loss in ionic conduction; signals in the lower part of the RF frequency range, e.g. signals below 1 GHz, such as signals in the range of 1-100 MHz, are particularly suitable as the changes in the dielectric properties of the food product induced by electrolytes of an ionic nature are particularly noticeable in the reflected signals in this frequency range. The ratio of reflected power to emitted power of an RF sensor probe (S11) is a good indicator of the electrolyte content in the food product. This will be demonstrated in more detail below by some examples.

Any suitable sensor geometry may be contemplated. The dielectric sensor 120 preferably is in physical contact with the food product. In case of a dielectric sensor 120 in physical contact with the food product, a particularly suitable geometry is an open-ended coaxial probe. The coaxial probe comprises a coaxial line for transmitting the RF signals and a flange in physical contact with the food product for sensing the induced electric field in the food product. The flange for instance may surround the coaxial line. In a non-contact geometry, the flange may be replaced by a transmission and receiver element such as an antenna or the like for collecting reflected RF signals in a non-contact mode. Such sensors are well-known per se and it should be understood that any suitable dielectric sensor, e.g. any suitable RF-based sensor, may be used in the food preparation apparatus 100.

The food preparation apparatus 100 may be used to prepare any suitable food product containing water for dissolving the electrolyte-comprising condiments. Watery food products such as soup, sauce, stew, and so on are particularly suitable as the condiments can be readily diffused or dissolved therein although other food products having lower water contents may also be prepared in the food preparation apparatus 100. A stirring element 105 may be present in the compartment 101 for stirring the food product. This for instance can speed up the even diffusion or dissolving of the condiments in the food product, which reduces the duration of a seasoning mode of the food preparation apparatus 100. The stirring element 105 may have any suitable geometry, e.g. a whisk, stirring blade, or the like. The stirring element 105 may be coupled to an electromotor (not shown) for driving the stirring element 105. The electromotor may be controlled in any suitable manner, e.g. by a (micro-) controller of the food preparation apparatus 100 such as the processor arrangement 110.

The processor arrangement 110 is communicatively coupled to the dielectric sensor 120, e.g. to control the generation of a transmission signal by the transmitter 121 and to process sensor data received from the dielectric sensor 120, e.g. a reflected signal received from the receiver 123. The processor arrangement 110 is further adapted to determine the dielectric property of a food product in the food preparation compartment 101 from the sensor data provided by said dielectric sensor 120. In a preferred embodiment, the dielectric property determined by the processor arrangement 110 is the previously explained signal strength ratio S11. The processor arrangement 110 may be communicatively coupled to the dielectric sensor 120 in any suitable manner, e.g. in a wired or wireless fashion.

The processor arrangement 110 may comprise a detection stage (not shown) for detecting the sensor reading provided by the dielectric sensor 120, a determination stage (not shown) for determining the dielectric property of the food product from the detected sensor reading and a seasoning instruction generation stage 136 for generating a seasoning instruction signal for adding a particular condiment in a specified amount to the food product in the compartment 101 as a function of the determined dielectric property of the food product. It should be understood that the processor arrangement 110 may comprise discrete stages, which may be implemented in any suitable manner, e.g. using different processing elements such as different cores of a single processor or different discrete processors, e.g. microprocessors. It is however equally feasible that the processor arrangement 110 does not contain discrete physical stages but that the processor arrangement 110 implements these different stages on a single processor architecture, e.g. in the form of computer program instructions executed on this processor architecture. It suffices to say that any suitable implementation of the functionality conceptually provided by these stages may be contemplated.

The processor arrangement 110 is further communicatively coupled to a data storage device 130, e.g. a non-volatile memory or the like. The data storage device 130 is adapted to store food seasoning data as a function of a dielectric constant of the food product, said food seasoning data relating to a plurality of condiments to be added to the food product. For example, the data storage device 130 may contain an electronic database of recipes, i.e. an electronic cookbook or recipe book containing recipes for predefined dishes to be prepared in the compartment 101 of the food preparation apparatus 100. A recipe may for instance specify an expected change in dielectric property per unit of a particular condiment added to the food product, and specify the units of condiments of the condiment to be added to a known quantity of the food product such that the processor arrangement can generate a seasoning instruction signal for adding an amount of said condiment of said plurality to the food product based on the retrieved food seasoning data retrieved from the data storage device 130. The processor arrangement 110 may repeat the generation of these seasoning instruction signals for each condiment to be added to the food product as specified in the electronic database of recipes until all condiments of said plurality have been added to the food product, as will be explained in more detail below.

The electronic database of recipes may be pre-stored in the data storage device 130. In an embodiment, the electronic database of recipes may be programmable in order to allow a user of the food processing apparatus 100 to alter pre-stored recipes in the electronic database of recipes in order to adjust these recipes to the personal taste of the user or to add new recipes to the electronic database of recipes, e.g. by specifying the desired units of the condiments to be added to the dish. The electronic database of recipes may further comprise different recipes for the same dish such that the user can select a recipe closest to his or her personal taste. These are just some non-limiting examples of how the recipe data in the data storage device 130 may be structured and managed; it should be understood that the recipe data in the data storage device 130 may be structured and managed in any suitable manner.

In order to allow user interaction with the electronic database of recipes in the data storage device 130, the food preparation apparatus 100 may further comprise a user interface 140 including a display 141. The user interface 140 may be controlled in any suitable manner, e.g. by the processor arrangement 110 or by another controller of the food preparation apparatus 100. The user interface 140 may take any suitable form, e.g. comprise at least one of dials, buttons or the like to allow the user to select, alter or program recipes in the electronic database of recipes in the data storage device 130. In an embodiment, the display 141 may be touch-sensitive such that user inputs may be provided through the display 141, e.g. in combination with other input devices of the user interface 140. Such user interfaces are well-known per se, and it should be understood that any suitable type of user interface may be used for the user interface 140. In particular, the user interface 140 does not have to be integral to the food preparation apparatus 100; in some embodiments the user interface 140 is physically separated from the food preparation apparatus 100 and arranged to communicate with the food preparation apparatus 100 in wireless fashion. Such a remote user interface 140 may be a dedicated user interface 140 or a user interface function implemented on a mobile communication device, e.g. in the form of a software application on a smart phone, tablet or the like. The remote user interface 140 may alternatively be integrated in a cooking utensil or the like to be used with the food preparation apparatus 100.

In the food preparation apparatus 100 in FIG. 1, the processor arrangement 110 is adapted to generate the aforementioned seasoning instruction signals to generate seasoning instructions on the display 141, i.e. the seasoning instruction signals are display control signals. In this embodiment, the user of the food preparation apparatus 100 is required to manually add the specified amounts of the specified condiments as per the instructions displayed on the display 141 to the compartment 101.

To this end, the food preparation apparatus 100 comprises a condiment inlet 103 providing access to the compartment 101. The inlet 103 may be located in any suitable location, e.g. through a wall of the compartment 101. In a particularly advantageous embodiment, the inlet 103 is located in a lid 102 of the compartment 101. This makes it easier to clean the inlet 103 whilst ensuring that the moisture content of the food product in the compartment 101 and/or the temperature of the food product stays substantially constant during the seasoning of the food product as the lid does not need to be removed from the compartment 101 when adding the condiment. This is important as changes in the moisture content and temperature affect the dielectric properties of the food product, which complicates the interpretation of the changes in the dielectric properties of the food product monitored with the dielectric sensor 120 as these changes cannot be solely contributed to added condiments where significant moisture loss has occurred.

Figure 2:
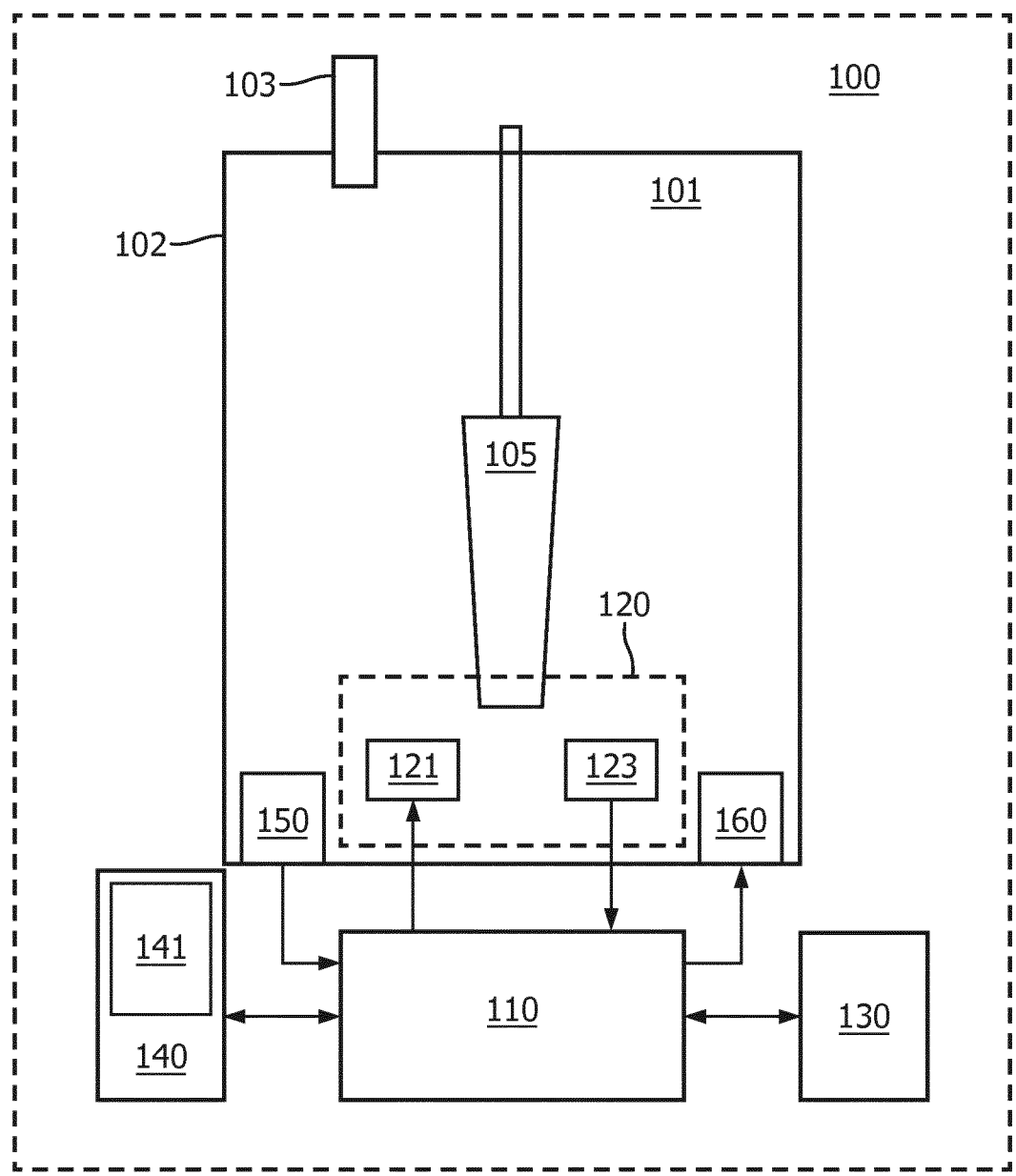
FIG. 2 schematically depicts a food preparation apparatus according to another embodiment.

FIG. 2 schematically depicts a food preparation apparatus 100 according to another embodiment. The food preparation apparatus 100 in FIG. 2 differs from the food preparation apparatus 100 in FIG. 1 in that the food preparation apparatus 100 further comprises a heating element 160 and a temperature sensor 150 under control of the processor arrangement 110. The heating element 160 and a temperature sensor 150 may be used to control the heating of the food product in the compartment 101, e.g. during preparation of the food product in the food preparation apparatus 100, e.g. cooking the food product. The food preparation apparatus 100 may be a food cooking apparatus in this embodiment. Heating elements and temperature sensors for use in such apparatuses are well-known per se and it suffices to say that any suitable heating element 160 and temperature sensor 150 may be employed in the food preparation apparatus 100.

In an embodiment, the processor arrangement 110 is adapted to control the temperature of the food product during seasoning, i.e. in a seasoning mode of the food preparation apparatus 100. As will be readily understood, it is important to obtain an accurate and stable sensor reading from the dielectric sensor 120 in order to generate accurate seasoning instruction signals with the processor arrangement 110. As previously explained, changes in the moisture content of the food product in the compartment 101 can negatively impact on this such that it is important to avoid such loss of moisture during seasoning of the food product. Moreover, the quality of the sensor signals captured by the dielectric sensor 120 can deteriorate at elevated temperatures because of increased turbulence in the food product at such elevated temperatures, e.g. generation of bubbles or the like. Furthermore, the homogeneity of the food product may change at elevated temperatures due to the separation of certain constituents such as lipids, proteins or the like from the food product. It is therefore beneficial to control the temperature of the food product during seasoning, i.e. limit the temperature of the food product to avoid extensive moisture loss and/or turbulence, for instance.

In an embodiment, the processor arrangement 110 is adapted to limit the temperature of the food product to 50° C. below, more preferably to about 43° C. below during seasoning for this reason. The processor arrangement 110 is preferably adapted to keep the food product at a more or less constant temperature during seasoning as this minimizes undesirable fluctuations in the dielectric property of the food product. The processor arrangement 110 for example may achieve such control over the temperature during seasoning by controlling the heating element 160 in response to temperature data provided by the temperature sensor 150.

The processor arrangement 110 may implement an estimation model in which the changes to the dielectric property of the food product may be estimated as a function of temperature. Consequently, the seasoning instruction signals generated by the processor arrangement 110 may be generated using this estimation model. Alternatively, the estimation model may be at least in part stored in the data storage device 130, e.g. as part of the electronic recipe database.

Figure 3:
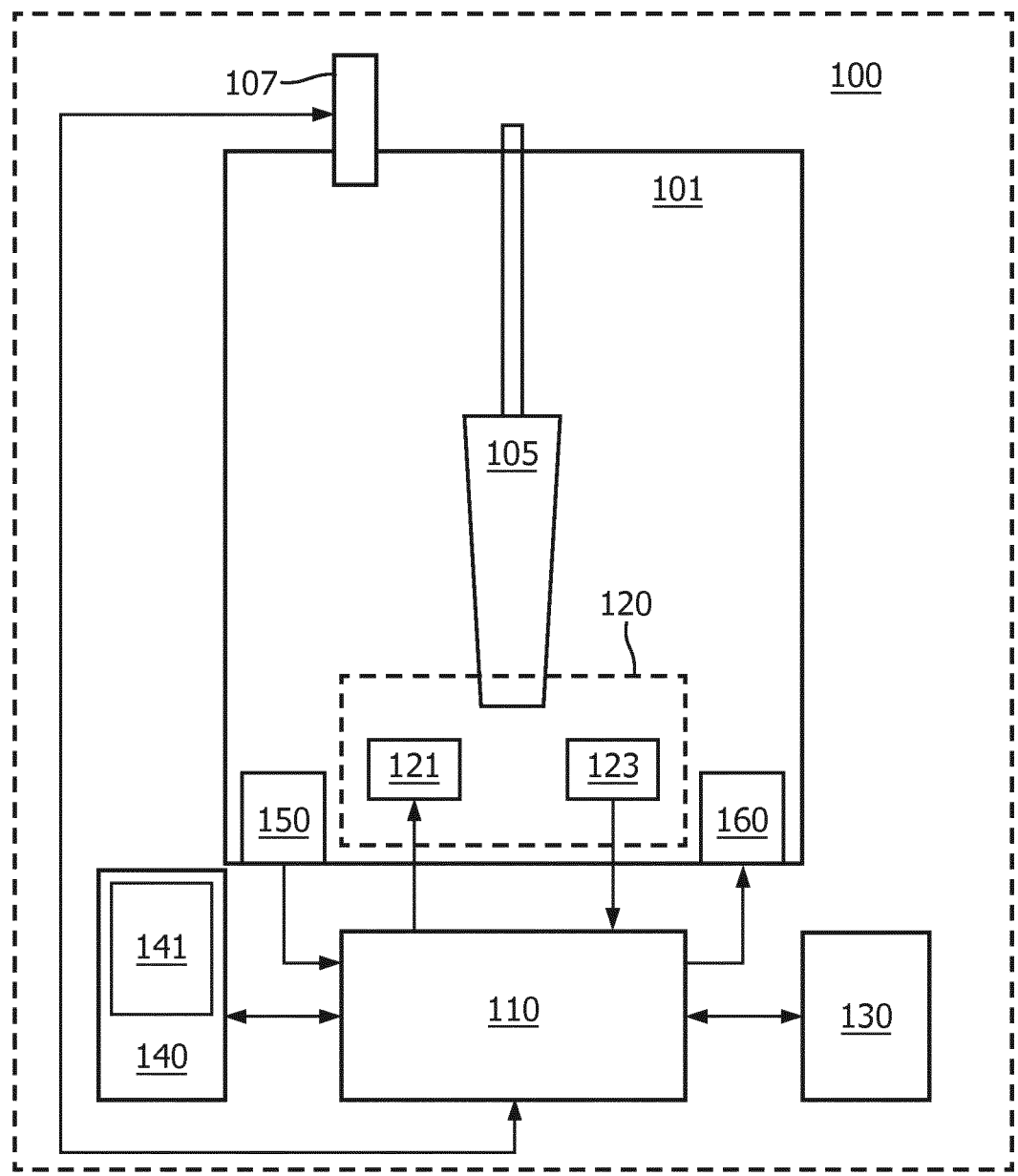
FIG. 3 schematically depicts a food preparation apparatus according to yet another embodiment.

FIG. 3 schematically depicts an alternative embodiment of the food preparation apparatus 100, in which the condiment inlet 103 is replaced by a plurality of seasoning dispensing units 107 each having a controllable outlet for dispensing one of said condiments into the food preparation compartment 101. In this embodiment, the processor arrangement 110 is adapted to generate a seasoning instruction signal in the form of an outlet control signal for controlling the outlet of the seasoning dispensing unit 107 containing the condiment to be added to the food product to be seasoned. This provides automated seasoning of the food product, thereby avoiding the risk of user error when seasoning the food product in accordance with the seasoning instruction signals generated by the processor arrangement 110.

Several operational aspects and embodiments of the food preparation apparatus 100 will now be explained in further detail with the aid of FIG. 4, which depicts a flowchart of a method 200 for seasoning the food product with the food preparation apparatus 100. The method 200 may start in step 201 with switching on the food preparation apparatus 100 and filling the compartment 101 with the major ingredients of the food product to be prepared, e.g. meat, vegetables, water and so on.

Next, a food preparation recipe is selected from the electronic recipe database in the data storage device 130 in step 203, e.g. by a user using the user interface 140 or in any other suitable manner. As previously explained, the recipes in the electronic recipe database typically specify the amounts of a particular condiment to be added to the food product to be prepared and an indication of an associated change in the dielectric property of the food product.

In a preferred embodiment, the method 200 proceeds to step 205 in which the processor arrangement 110 sets the temperature of the food product in the compartment 101, e.g. by controlling the heating element 160 using the temperature data provided by the temperature sensor 150 as previously explained in order to set the temperature of the food product to a temperature suitable for accurate seasoning, e.g. a temperature of 50° C. or below or more preferably a temperature of 43° C. below. The processor arrangement 110 may be adapted to maintain the food product at the desired temperature during seasoning of the food product. The processor arrangement 110 may check in step 207 if the desired temperature has been achieved. If this is not the case, the method 200 refers back to step 205, otherwise the method 200 proceeds to step 208 in which a condiment to be added to the food product is selected, followed by step 209 in which a seasoning instruction signal for the selected condiment is generated. To this end, the processor arrangement 110 may employ an estimation model that uses parameters such as food product temperature, dish type, condiment type and so on. The processor arrangement 110 may determine the amount of selected condiment to be added to the food product based on the food seasoning information provided in the electronic recipe database as well as on the initial dielectric property of the food product, as this may be indicative of the amount of water present in the food product as previously explained. This for instance may be relevant if the processor arrangement 110 is adapted to control a cooking process of the food product by monitoring the water loss from the food product based on changes in the dielectric property determined using the dielectric sensor 120.

Next in step 210 the selected condiment is added to the food product, e.g. in accordance with the seasoning instruction signal in case of automated seasoning of the food product, after which the dielectric property of the food product is determined by the processor arrangement 110 using the sensor data provided by the dielectric sensor 120 as previously explained in step 211. In a preferred embodiment, the processor arrangement 110 is adapted to subsequently monitor changes in the dielectric property of the food product caused by the addition of the selected condiment following the generation of the seasoning instruction signal in step 209. This monitoring for instance may be performed in step 213. The processor arrangement 110 for instance may determine a target dielectric property value for the food product resulting from the addition of the selected condiment and may keep monitoring the dielectric property of the food product, e.g. in step 211, and optionally may dynamically adjust the seasoning instruction signal in accordance with monitored changes to the dielectric property of the food product, e.g. in order to provide a user with updated seasoning addition instructions on the display 141 to provide the user with feedback about the amount of seasoning already added. This may be useful to the user as it may indicate to the user at which rate the user is adding the selected condiment, such that the user can adjust the adding rate, e.g. slow the adding rate to avoid overshooting the desired amount in case the feedback indicates that the desired amount of selected condiment to be added has almost been reached or increase the adding rate if the feedback indicates that substantially more of the selected condiment still needs adding. Similarly, such feedback may be used to control the outlet of a selected condiment dispensing unit 107, e.g. to slow or increase the rate of condiment addition to the food product through the outlet in order to ensure that the appropriate amount of the condiment is added to the food product without undue delay.

In this manner, the processor arrangement 110 may be adapted to implement an iterative procedure for adding a selected condiment to the food product, in which a plurality of target values of the dielectric property of the food product as achieved by the addition of the correct sub-amount of a selected condiment is generated in order to achieve the addition of the correct amount of the selected condiment to the food product by the plurality of iterations, i.e. by the addition of the correct sub-amounts, wherein the correct sub-amounts combine to the correct amount. This provides improved control over the condiment addition process and reduces the risk of overshooting the desired amount of condiment to be added.

Figure 4:
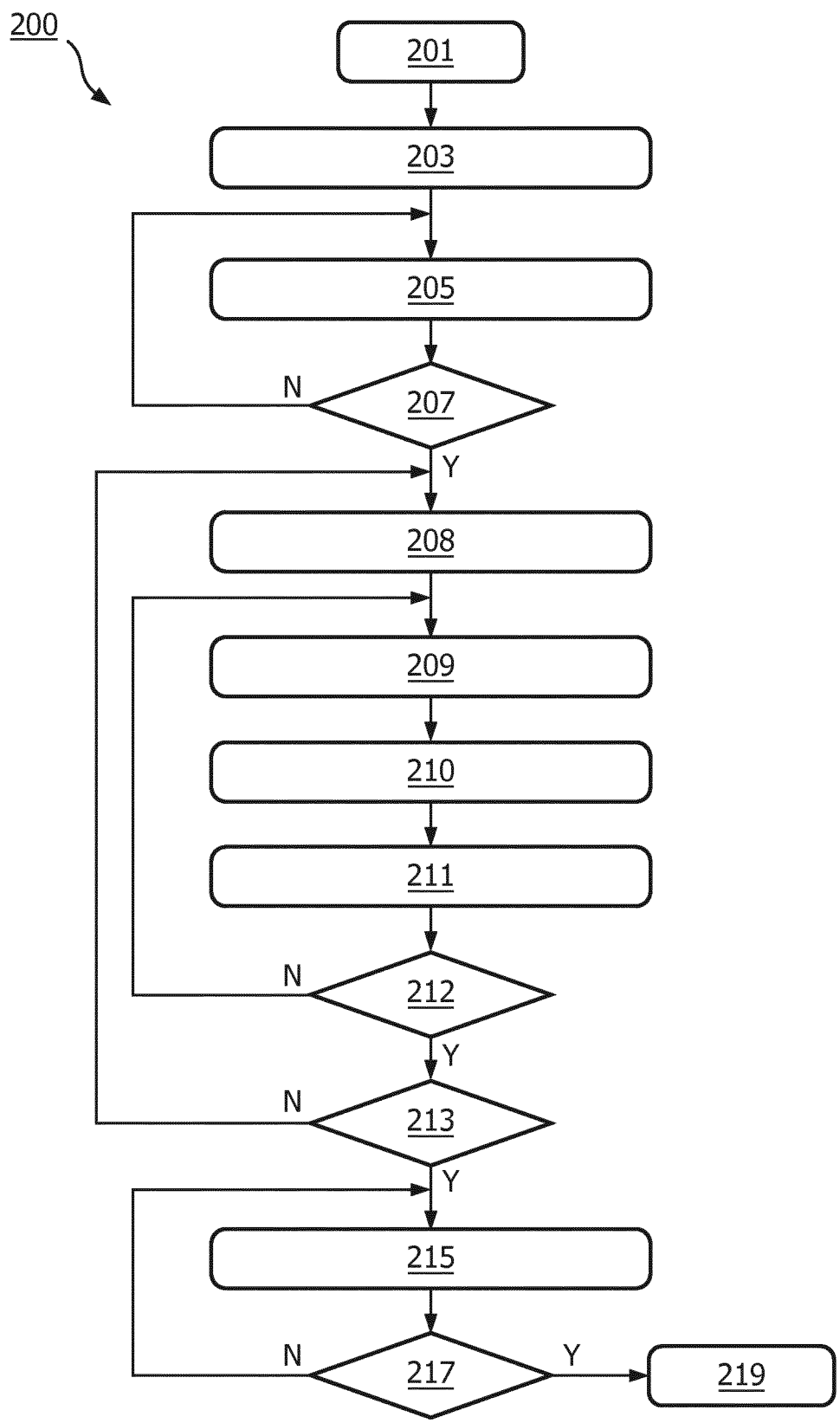
FIG. 4 depicts a flow chart of a method according to an embodiment.

Although not specifically shown in FIG. 4, the processor arrangement 110 may be adapted to generate a warning signal to indicate that a target amount of a selected condiment to be added to the food product is being approached. Such a warning signal may be generated in any suitable manner, e.g. on the user interface 140 such as on the display 141 or may be an audible warning signal generated using a loudspeaker or the like in the food preparation apparatus 100. The processor arrangement 110 may be further adapted to generate a warning signal if the target amount of the selected condiment to be added as being exceeded such that the user may take corrective actions, e.g. add more of the food product to the compartment 101 or discard the food product in the compartment 101 and start over again.

Once it has been decided in step 212 that the appropriate amount of the condiment selected in step 208 has been added to the food product, the method 200 proceeds to step 213 in which the processor arrangement 110 checks if all condiments to be added as specified in the selected recipe of the electronic recipe database have been added to the food product. If this is not the case, the method 200 to revert back to step 208 in which the processor arrangement selects the next condiment to be added to the food product and controls the addition of the next selected condiment to the food product as explained above.

Alternatively, the method 200 may revert back to step 205 to adjust and stabilize the temperature of the food product for addition of the next condiment if the next condiment is to be added to the food product at a different temperature than the previously added condiment. This for instance may be advantageous where different condiments have a desired solubility in the food product at different temperatures or wherein different condiments trigger sufficient changes in the dielectric properties of the food product at different temperatures, e.g. to facilitate accurate monitoring of the addition of the correct amount of the selected condiment.

In an embodiment, the processor arrangement 110 is adapted to generate the respective seasoning instruction signals for the respective condiments to be added to the food product in order of increasing electrolytic strength of the condiments. In other words, condiments causing a smaller change to the dielectric property per unit condiment may be added to the food product before adding condiments causing a larger change to the dielectric property of the food product produced condiment. Alternatively, the processor arrangement 110 may be adapted to order the condiments in terms of absolute changes to the dielectric property, that is the processor arrangement 110 may be adapted to determine for each condiment the expected change in the dielectric property of the food product as a result of the amount of that condiment to be added to the food product and order the condiments to be added to the food product in increasing expected change to the dielectric property.

This has the advantage that condiments expected to cause a smaller change to the dielectric property of the food product are added first, thereby avoiding the risk that the monitoring of the changes in the dielectric property of the food product caused by the addition of the condiment to the food product are obscured by high baseline measurement errors. The processor arrangement 110 may be adapted to determine the order in which the condiments are to be added to the food product based on the seasoning information in the electronic recipe database in the data storage device 130 or alternatively the order in which the condiments are to be added to the food product may be defined in the electronic recipe database.

Any suitable electrolyte-generating condiment may be added in this manner. At least some of the condiments may be salt (NaCl)-containing condiments, wherein the electrolytes to be generated in the food product are predominantly the $Na^+$ and $Cl^-$ ions of the salt. In an embodiment, most or all of the condiments to be added are salt-containing condiments. As explained above, such condiments may be added in order of increasing salt content.

Once it is determined in step 213 that all condiments have been added to the food product in their appropriate amounts, the method 200 may progress to step 215 in which the food product is further prepared, e.g. cooked, for instance in case the food preparation apparatus 100 is a food cooking apparatus. To this end, the processor arrangement 110 may be adapted to control the heating element 160 in response to temperature data provided by the temperature sensor 150. For example, the processor arrangement 110 may be adapted to bring the food product to a boiling temperature and keep the food product at a boiling temperature for a predefined amount of time, e.g. as specified in the electronic recipe database, in order to complete the preparation of the food product.

In an embodiment, the processor arrangement 110 is adapted to monitor changes in the dielectric property of the food product during the cooking step 215. For example, the processor arrangement may be adapted to check in step 217 if the initial dielectric property of the food product, e.g. the dielectric property of the food product prior to adding the condiments or the dielectric property of the food product including the added condiments has reached a target dielectric property indicative of the completion of the preparation of the food product, e.g. the cooking of the food product. This monitored change in the initial dielectric property of the food product for instance may be indicative of the food product having lost a predefined amount of water, such that the food product has reached a desired consistency, e.g. water content, such that the food product has achieved the desired concentration of condiments. For example, the processor arrangement 110 may be adapted to follow a certain time-temperature profile for a given recipe i, for which final water loss ratio ($R_i$) can be determined, such that for a condiment j requiring a final concentration of $C_jF$, at the conclusion of a cooking process, the processor arrangement 110 may be adapted to determine this final concentration from an initial concentration $C_j0$ of the condiment in the food product after seasoning based on the formula $C_j0=C_jF(1-R_i)$.

In an embodiment, the processor arrangement 110 is adapted to control the dielectric sensor to transmit RF signals of a higher frequency during the food preparation stage, e.g. cooking stage than during the seasoning stage, e.g. to generate RF signals at 100 MHz or more. This is because changes in the dielectric property of the food product during preparation, e.g. cooking, are dominated by changes in the water content of the food product, which changes the total number of dipoles in the food product. Energy loss in dipole rotation is typically triggered by high frequency parts of the RF domain, such that such energy loss is more clearly noticeable when probing the food product with RF signals in these high frequency parts of the RF domain.

Next, proof of concept for the food processing apparatus according to embodiments of the present application will be provided by the following examples. These examples are for illustrative purposes only and are not intended to limit the present invention.

EXAMPLES

Several experiments are presented to demonstrate the possibility of using RF sensing to detect dielectric changes in a food product induced by the addition of NaCl, which is the most widely contained electrolyte in many condiments; e.g. 12 g/100c in light soy sauce, 20 g/100 cc in dark soy sauce, 11 g/100 cc in oyster sauce, 2.5 g/100c in rice vinegar, 3% in ketchup, 2.8% in mustard, and so on, and often its content is clearly labeled as required by the applicable food standards and regulations.

Dielectric properties were measured with a coaxial open-end probe consisting of a coaxial cable with a male SMA (small A type) connector and SMA panel jack with a flange (RS Components Ltd.). The probe is connected to a vector network analyzer (VNA, Agilent E5071C) on one end and in direct contact with a sample solution at the other end. The probe is configured to deliver RF signals from the VNA port into the sample and to collects the reflection of these signals with the flange in order to determine the reflection coefficient S11. The magnitude of S11 typically decreases as the loss factor in the sample increases, which is a typical consequence of higher electrolyte concentrations in the sample solution.

Example 1

Different NaCl concentrations (0.5, 1, 1.5, 2, 2.5, 3% of water weight) were prepared in distilled water maintained at a temperature of 40° C. and their dielectric spectra recorded using the above described setup. A frequency sweep from 1 MHz to 10 GHz was applied to each sample. The salt concentrations in the samples is considered to range from lightly salted (<1%), medium salted (2%) to (unpleasantly) intensely salted (3%) when relating these concentrations to salt concentrations in a watery food product.

Example 2

Different NaCl concentrations (0.5, 1, 1.5, 2, 2.5, 3% of water weight) were prepared in distilled water thickened with 9.25% corn starch (1 table spoon in 1 cup water) and maintained at a temperature of 40° C. during recording of their dielectric spectra using the above described setup. A frequency sweep from 1 MHz to 10 GHz was applied to each sample.

Example 3

Different NaCl concentrations (0.5, 1, 1.5, 2, 2.5, 3% of water weight) were prepared in distilled water thickened by 1, 2, 5 wt % gelatin respectively and maintained at a temperature of 40° C. during recording of their dielectric spectra using the above described setup. A frequency sweep from 1 MHz to 10 GHz was applied to each sample. Gelatin was chosen because it is a collagen derivative, which for instance mimics meat soups having various soluble proteins.

Example 4

Different NaCl concentrations (0.5, 1, 1.5, 2, 2.5, 3% of water weight) were prepared in distilled water thickened by 1 wt % gelatin respectively and maintained at a temperature of 50° C. during recording of their dielectric spectra using the above described setup. A frequency sweep from 1 MHz to 10 GHz was applied to each sample.

Example 5

A NaCl concentration of 0.5 wt % relative to the total water weight was prepared in distilled water thickened by 1 wt % gelatin and maintained at different temperatures (30, 40, 50, 60, 70, 80° C.). At each temperature, the dielectric spectrum was recorded using the above described setup. A frequency sweep from 1 MHz to 10 GHz was applied to each sample during the recording of each spectrum.

Figure 5:
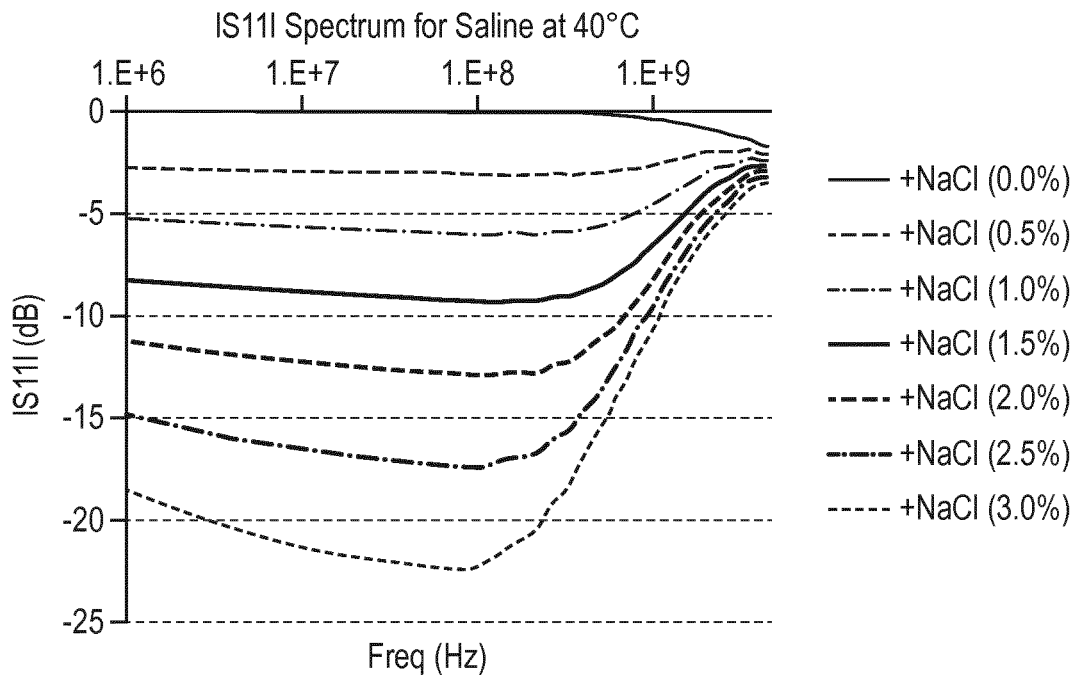
FIG. 5 depicts a graph logarithmically demonstrating the frequency-dependent change in dielectric property of different saline concentrations.
Figure 6:
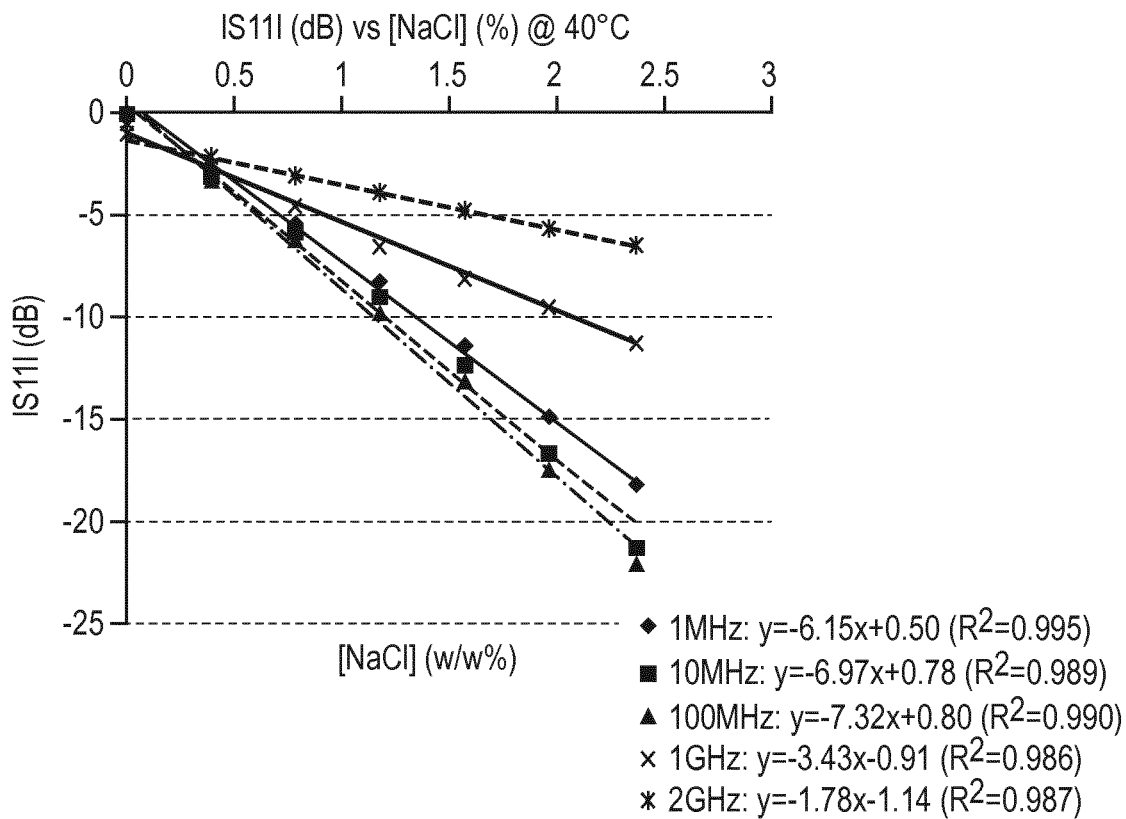
FIG. 6 is a graph showing a linear regression of the data in FIG. 5.

The full logarithmic spectrum of |S11| for the different NaCl concentration samples of Example 1 is shown in FIG. 5, whereas FIG. 6 depicts the linear regression of the values of |S11| as a function of NaCl concentration of the different samples in Example 1 at different probing frequencies. This shows that |S11| declined in linear proportion (R2≥0.98 in all linear regressions) with increasing salt concentration over a broad frequency band (1 MHz to as high as 4 GHz). The slopes of the linear regressions in FIG. 6 further show that the magnitude response increases with frequency in the frequency range below 100 MHz. At higher frequencies, the magnitude response decreases quickly with frequency. This observation therefore demonstrates that |S11| decreases more strongly for lower frequency RF signals, which shows that the changes in the dielectric property are dominated by increased electrolyte concentrations in the samples.

Figure 7:
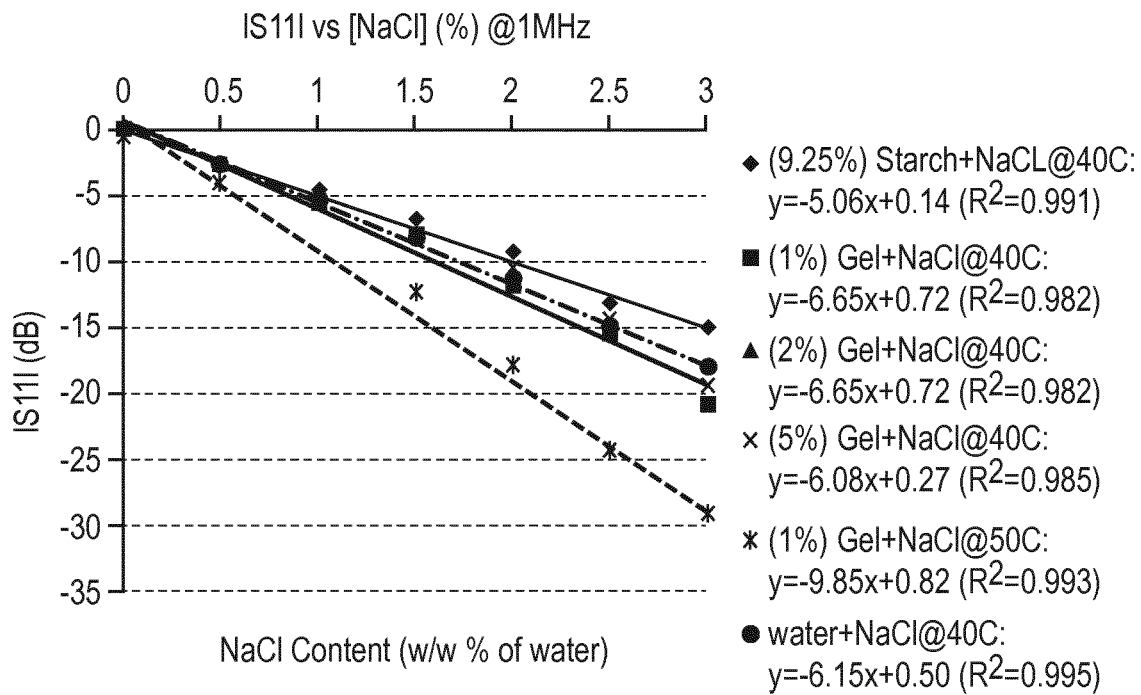
FIG. 7 depicts a graph showing a linear regression of the frequency-dependent change in RF signal reflection of NaCl solutions in watery mediums with different viscosity when probed at 1 MHz.
Figure 8:
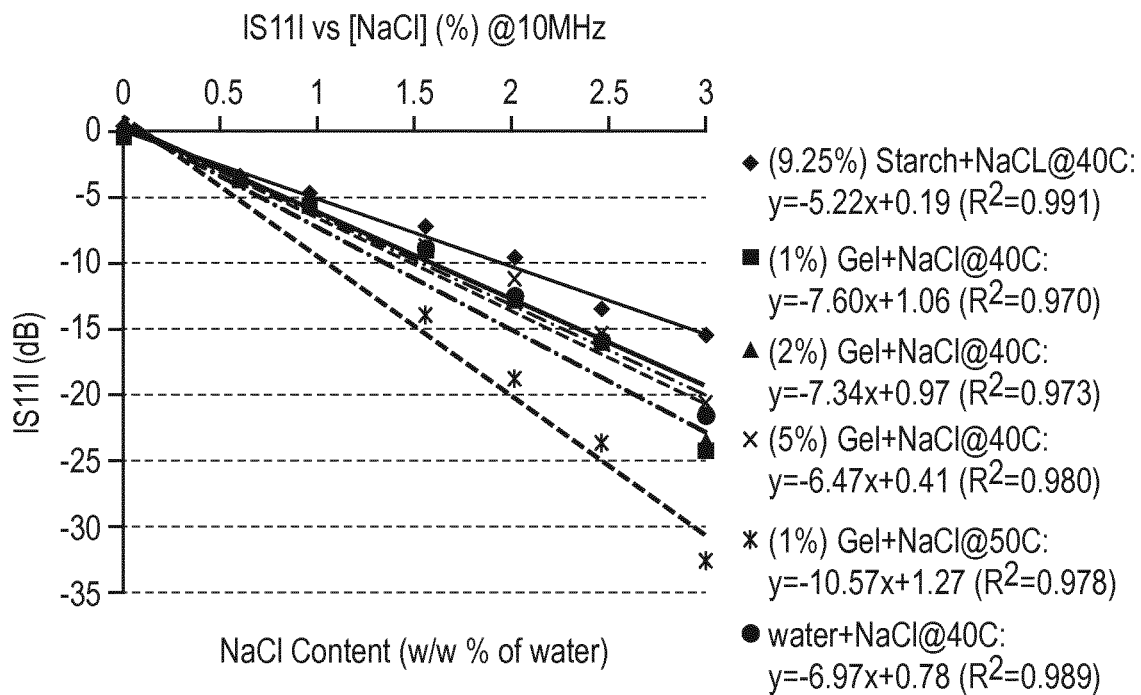
FIG. 8 depicts a graph showing a linear regression of the frequency-dependent change in RF signal reflection of NaCl solutions in watery mediums with different viscosity when probed at 10 MHz.
Figure 9:
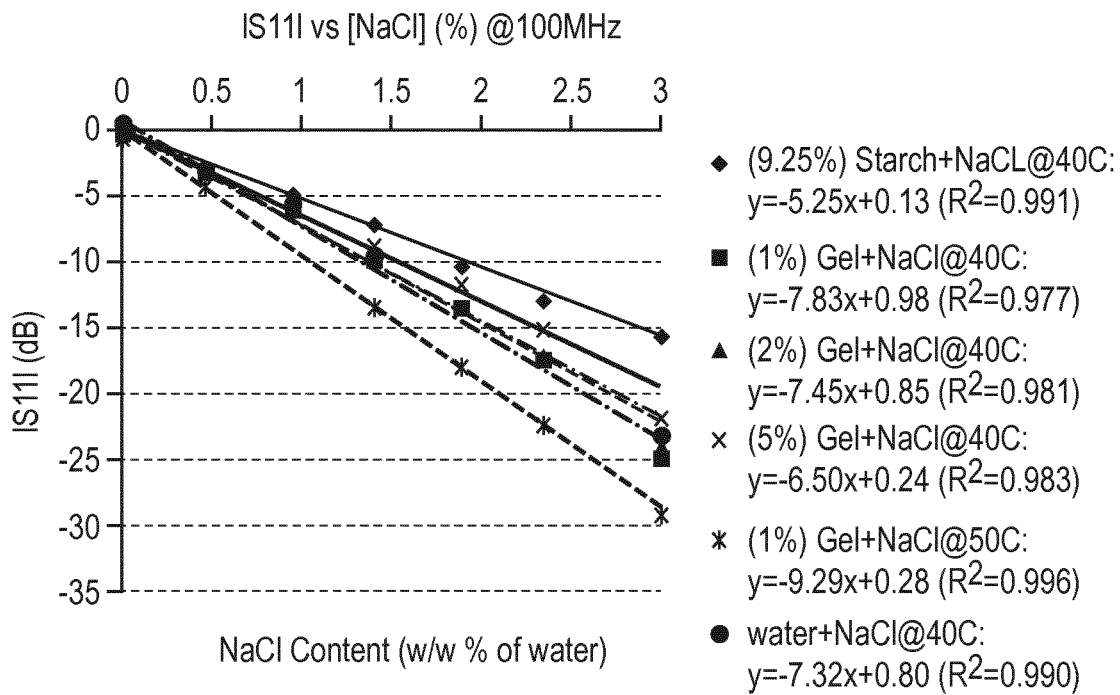
FIG. 9 depicts a graph showing a linear regression of the frequency-dependent change in RF signal reflection of NaCl solutions in watery mediums with different viscosity when probed at 100 MHz.
Figure 10:
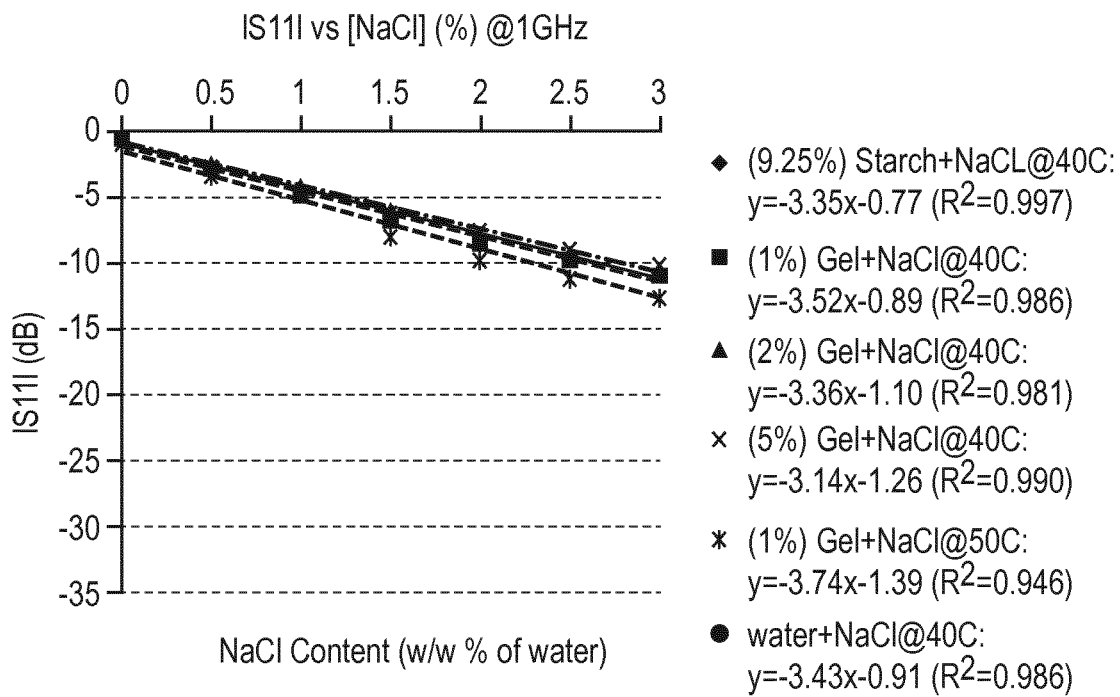
FIG. 10 depicts a graph showing a linear regression of the frequency-dependent change in RF signal reflection of NaCl solutions in watery mediums with different viscosity when probed at 1 GHz.
Figure 11:
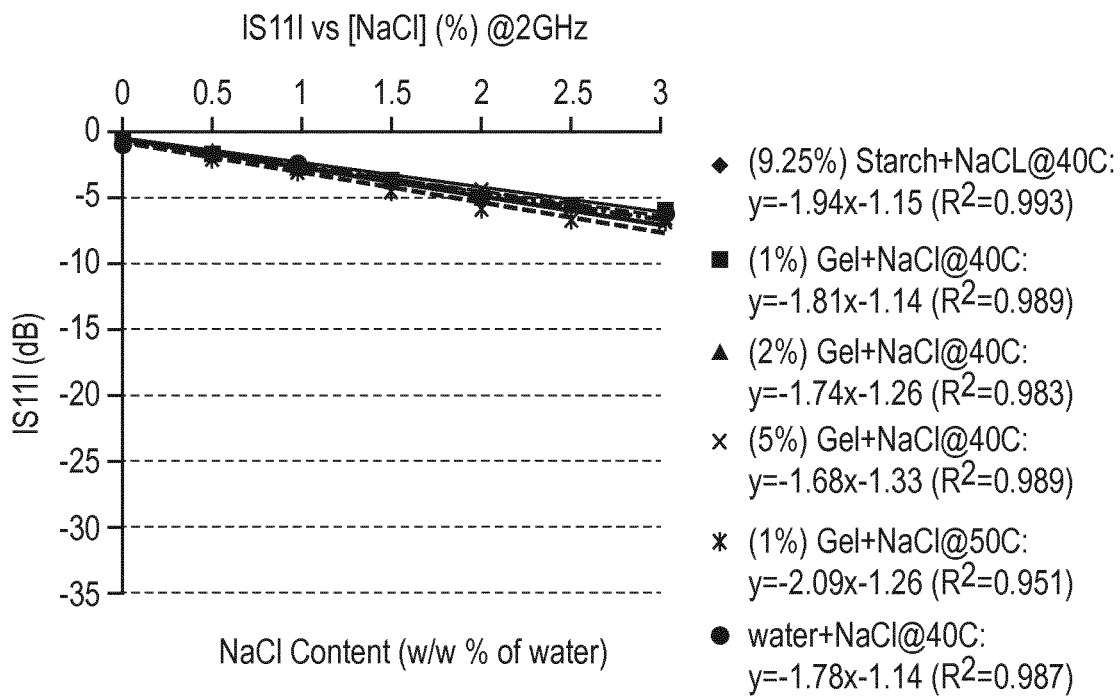
FIG. 11 depicts a graph showing a linear regression of the frequency-dependent change in RF signal reflection of NaCl solutions in watery mediums with different viscosity when probed at 2 GHz.

The |S11| linear regression of NaCl concentrations at different frequencies in different watery mediums as per Examples 2-4 is depicted in FIG. 7-11. These results demonstrate that the trends observed in Example 1 are not significantly affected by changes in the constitution of the water samples, e.g. when adding starch or gelatin to the samples. Comparing the response of the thickened samples at lower frequency ranges, i.e. up to 100 MHz as shown in FIG. 7-9, it was found that the thickening with 9.25 wt % starch reduces the magnitude of the |S11| response (i.e. the slope of the linear regression) significantly, while thickening the samples with 5 wt %, 2 wt % and 1 wt % gelatin respectively does not have noticeable impact on the response magnitude. However, heating the saline solution comprising 1 wt % gelatin solution to 50° C. remarkably increases the |S11| magnitude response compared to the magnitude of the response of the same sample at 40° C. This can be understood from the fact that energy loss of a given elecotrolyte concentration increases with increasing temperature. As before, these differences diminish at higher probing frequencies, i.e. at probing frequencies of 1 GHz or higher, as shown in FIGS. 10 and 11. This again indicates that at such higher probing frequencies the monitored dielectric property is insensitive to the change in ionic conductivity.

Figure 12:
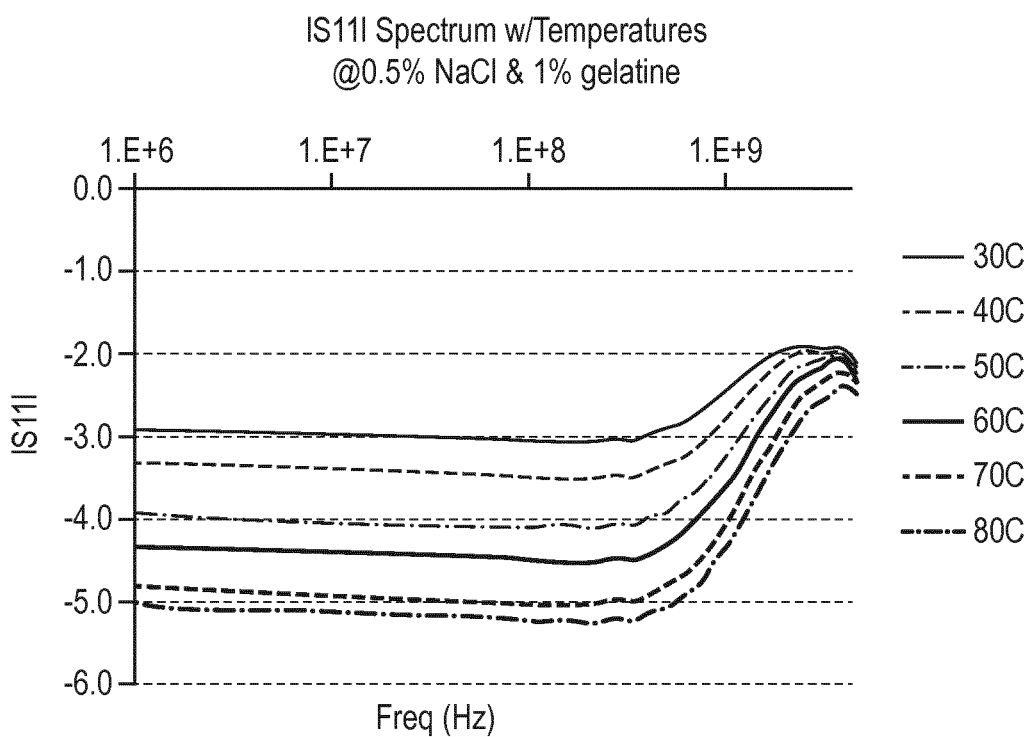
FIG. 12 depicts a graph demonstrating the frequency-dependent change in RF signal reflection of a NaCl solution as a function of temperature.

FIG. 12 depicts the recorded logarithmic |S11| spectra of the samples of Example 5, in which the influence of temperature on the measured dielectric property was investigated. It can be seen that |S11| decreased over the entire probe spectral frequency range with increasing temperature. This therefore demonstrates the benefit of stabilizing temperature and taking temperature in account as a parameter for accurately monitoring the amount of condiment to be added to a food product using the dielectric property |S11|

Over all, the above experiments demonstrate that the logarithmic |S11| response can be used to estimate electrolyte concentration in a water-containing food product by simple linear regression. It has been demonstrated that this is particularly suitable for adding condiments in a controlled fashion to watery dishes with light to heavy salinity and with thickening agents commonly used in cooking. The food preparation apparatus 100 and method 200 may be used over a wide frequency range, preferably using frequencies of 100 MHz and below due to the high sensitivity of the monitored dielectric property to ionic conductivity changes in the food product, as demonstrated above.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A food preparation apparatus comprising:
a food preparation compartment;
a dielectric sensor in said food preparation compartment,
a data storage device storing food seasoning data as a function of a dielectric constant of the food product, said food seasoning data relating to a plurality of condiments to be added to the food product; and
a processor arrangement coupled to said dielectric sensor and adapted to:
determine a dielectric property of a food product in the food preparation compartment from sensor data provided by said dielectric sensor;
retrieve food seasoning data for the food product corresponding to the determined dielectric property from the data storage device; and,
for each condiment of said plurality generate a seasoning instruction signal for adding an amount of said condiment of said plurality to the food product based on the retrieved food seasoning data until all condiments of said plurality have been added to the food product.

2. The food preparation apparatus of claim 1, wherein the processor arrangement is adapted to:
monitor a change in the dielectric property of the food product from said sensor data, wherein said change is indicative of the addition of one of said condiments; and, upon the monitored change indicating that the amount of the previous condiment has been added to the food product:
generate an updated seasoning instruction signal for adding an amount of a next condiment of said plurality to the food product based on the retrieved food seasoning data.

3. The food preparation apparatus of claim 2, wherein the processor arrangement is adapted to dynamically adjust the seasoning instruction signal for adding a condiment to the food product in response to said monitored change and/or to generate a warning signal if the monitored change is indicative of an excess of said condiment having been added to the food product.

4. The food preparation apparatus of claim 1, wherein the processor arrangement is adapted to generate the respective seasoning instruction signals for said condiments such that the condiments are added to the food product in a sequence of increasing electrolyte strength.

5. The food preparation apparatus of claim 1, further comprising a temperature sensor and a heating element, wherein the processor arrangement is arranged to control the heating element in response to a sensor signal provided by the temperature sensor.

6. The food preparation apparatus of claim 5, wherein the processor arrangement is adapted to control the heating element such that a temperature of the food product is maintained below a boiling temperature of the food product during determination of said dielectric properties and subsequent generation of said seasoning instruction signals.

7. The food preparation apparatus of claim 6, wherein the processor arrangement is adapted to maintain the temperature of the food product to below 50° C., preferably at around 43° C. or less.

8. The food preparation apparatus of claim 1, further comprising a display, wherein the seasoning instruction signals are adapted to display seasoning instructions on said display.

9. The food preparation apparatus of claim 1, further comprising a lid on said food preparation compartment, said lid including an inlet for said condiments.

10. The food preparation apparatus of claim 1, further comprising a plurality of seasoning dispensing units each having a controllable outlet for dispensing one of said condiments into the food preparation compartment, wherein each seasoning instruction signal is adapted to control the outlet of the seasoning dispensing unit comprising the condiment to be added to the food product.

11. The food preparation apparatus of claim 1, wherein the dielectric sensor comprises a RF (radiofrequency) transmitter for transmitting RF signals into the food product and a receiver for receiving reflected RF signals from said food product, wherein the processor arrangement is adapted to derive the dielectric property from the reflected RF signals.

12. The food preparation apparatus of claim 1, further comprising a stirring element for stirring the food product in the food preparation compartment.

* * * * *